(12) United States Patent
Wilks et al.

(10) Patent No.: US 8,949,813 B2
(45) Date of Patent: Feb. 3, 2015

(54) SYSTEMS AND METHODS FOR FACILITATING ACTIVATION OF OPERATING SYSTEMS

(75) Inventors: Andrew W. Wilks, Austin, TX (US); Keung S. Kim, Round Rock, TX (US); MyPhuong N. Sang, Austin, TX (US)

(73) Assignee: Dell Products LP, Round Rock, TX (US)

( * ) Notice: Subject to any disclaimer, the term of this patent is extended or adjusted under 35 U.S.C. 154(b) by 721 days.

(21) Appl. No.: 13/194,323

(22) Filed: Jul. 29, 2011

(65) Prior Publication Data

US 2013/0031541 A1 Jan. 31, 2013

(51) Int. Cl.
*G06F 9/44* (2006.01)
(52) U.S. Cl.
USPC ............................. 717/168; 713/166
(58) Field of Classification Search
USPC ........ 713/166, 185, 156, 323; 726/35, 19, 26, 726/1, 20; 307/18; 709/223, 221; 717/168–178
See application file for complete search history.

(56) References Cited

U.S. PATENT DOCUMENTS

| 2003/0037237 A1* | 2/2003 | Abgrall et al. | 713/166 |
| 2006/0253702 A1* | 11/2006 | Lowell et al. | 713/156 |
| 2006/0288422 A1* | 12/2006 | Liu et al. | 726/26 |
| 2008/0229433 A1* | 9/2008 | Chen | 726/35 |
| 2009/0063844 A1* | 3/2009 | Hou et al. | 713/100 |
| 2012/0036308 A1* | 2/2012 | Swanson et al. | 711/1 |

OTHER PUBLICATIONS

Wikipedia, "System Locked Preinstallation", Printed from Internet Jul. 25, 2011, 2 pgs.

* cited by examiner

*Primary Examiner* — Tuan A Vu
(74) *Attorney, Agent, or Firm* — Egan, Peterman, Enders LLP.

(57) ABSTRACT

Systems and methods are disclosed that may be implemented to install and use a replacement BIOS code stored in non-volatile memory of the system BIOS to facilitate activation of a new or replacement OS on an information handling system. The replacement BIOS code may include an activation certificate of authority information to activate a different version operating system for use on an information handling system that has been previously configured with a different operating system version along with a previous BIOS code that did not include the updated OEM activation string.

27 Claims, 3 Drawing Sheets

SYSTEMS AND METHODS FOR FACILITATING ACTIVATION OF OPERATING SYSTEMS

FIELD OF THE INVENTION

This application relates to information handling systems, and more particularly to activation of operating systems for information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system is commonly provided with an operating system that is stored on a storage device of the information handling system and executed by a central processing unit (CPU) of the information handling system. The operating system typically requires activation when first installed on the information handling system, e.g., by the original equipment manufacturer (OEM) or end user. For example, a retail end user may separately purchase a computer and operating system (OS) software disks. The retail user is required to enter a unique identifier (25-character product key) when installing the OS on the computer from the separately purchased software disks. The installed OS is in communication across the Internet with the OS manufacturer/supplier, and in response to entry of the correct unique identifier, the OS receives a product ID from the OS manufacturer/supplier, which serves to activate the OS on the computer.

In another method, OS activation of an operating system such as Microsoft Windows 7 may also be performed without requiring communication with the OS manufacturer/supplier. For example, OEM activation certificate of authority information may be embedded in the core basic input/output system (BIOS) code in non-volatile memory of the system BIOS. This information is in turn not accessible by the OS for activation until it is copied from the BIOS code to an ACPI SLIC table that is used by an advanced configuration and power interface (ACPI)-compliant BIOS program to store software licensing description information within the ACPI memory table. Whether or not the unique identifier information is copied to the ACPI table is controlled by two fields that are set at the time of OEM manufacturing: SLIC lock/unlock and SLIC enable/disable. If the SLIC table is enabled, the OEM activation certificate information is copied from the BIOS code to the SLIC table during Power On Self Test (POST). After manufacture, the SLIC table is locked and disabled if no operating system is purchased with the system and before shipment from the OEM to the end user (otherwise the SLIC table is enabled). Even though non-volatile memory of the system BIOS may be later updated during a BIOS Flash, it cannot be copied to the SLIC table when it is in the disabled state.

Upon installation of the OS on a particular computer (e.g., by the computer OEM), the OS queries the SLIC table during boot and the OEM activation certificate information found there is compared to certificate of authority information contained within the OS. If the stored OEM activation certificate information matches the certificate of authority information within the OS, the OS is activated. This activation procedure is performed using an OS activation string supplied by the OS provider (e.g., Microsoft) corresponding to the OS system version to be installed (e.g., Microsoft Windows 7), and which itself is installed in the system BIOS prior to installing the OS on the computer system main storage. Activation of the newly installed OS is not possible without the presence of the appropriate OS activation string. As previously described, this OS activation string can only be installed during original (e.g., OEM) factory configuration of the new computer system using an appropriate system interface, such as issuing the SMBIOS interface commands in manufacturing mode to unlock, enable and lock the SLIC table.

After activation, an end user may later wish to upgrade the OS running on the computer, e.g., from Microsoft Windows XP to Microsoft Windows Vista or Microsoft Windows 7 or to similarly upgrade between corresponding server OS versions. This requires installation and activation of the new OS on the existing computer. In some cases, corporate or in-house computer users may wish to upgrade the OS running on a large number of existing computers that are already deployed in the field. However, the onboard BIOS of these field systems only includes the original factory-installed OEM activation string corresponding to the existing original OS (e.g., Microsoft Windows XP).

Once deployed in the field, there is no system interface or other capability available to end users for utilizing a new OEM activation string to perform an OS upgrade (e.g., from Windows XP to Windows 7) in the field for a large number of computer systems. Once a computer system is shipped from the factory with the SLIC table disabled, it must be enabled before OS activation can occur. In order to enable the SLIC table, it must first be unlocked, then enabled, then locked again. However, BIOS code cannot do this unconditionally, nor can BIOS code simply be copied from one system to another system to pirate the activation. Thus, activation of the upgraded OS on each computer requires manual entry of the appropriate certificate of authority information for the new OS into that individual computer so that a product ID from the OS manufacturer/supplier (e.g., Microsoft) may be obtained for that computer from across the Internet.

SUMMARY OF THE INVENTION

Disclosed herein are systems and methods that may be implemented to install and use a replacement BIOS code stored in non-volatile memory of the system BIOS (e.g., a newly installed updated BIOS code) to facilitate activation of a new or replacement OS on an information handling system. The replacement BIOS code may include activation certificate of authority information (e.g., as an updated OEM activation string) operable to activate a different version operating system (e.g., a newly installed upgraded OS version) for use on an information handling system that has been previously configured with a different operating system version (e.g., older or previous version OS) along with a previous BIOS code that did not include the updated OEM activation string. The disclosed systems and methods may be advantageously employed in one embodiment to utilize such a replacement BIOS code to activate a newly-installed upgraded OS on a previously field-deployed information handling system (e.g., such as a desktop computer, laptop computer, server, etc.) that was originally deployed from the manufacturer and/or supplier to an end user with a different and previous OS version, and without the necessity of communication with a OS manufacturer/supplier (e.g., Microsoft) server or other network source across a network (e.g., such as the Internet) to complete the authorization process. Such an end user may be, for example, a corporate customer of the computer and OS supplier/manufacturer/s, a corporate information technology (IT) department, a home retail customer, etc.

Examples of field-deployment of an information handling system include, but are not limited to, deployment of an information handling system to field locations such as a customer or other end user's office or other police place of business, a customer or other end user's home, a school building, a customer or other end user's vehicle, a customer's remote location with no internet connectivity, etc. or any other field location to which an information handling system is deployed and operated by a customer or other end user or an end user's personnel or staff.

In one exemplary embodiment, the disclosed systems and methods may be implemented by providing a reserved System Management Interface (SMI) application programming interface (API) function in a replacement BIOS code, such as a field upgrade BIOS code that is installable in BIOS non-volatile memory of an information handling system to replace a previous version of system BIOS code on the system. Such a replacement BIOS code may be, for example, provided to an end user after an information handling system has been manufactured and delivered to the end user with an original BIOS code. In this exemplary embodiment, the reserved SMI API function may be configured to only provide service to an updater utility that is provided to the end user for installing the replacement BIOS code. Such an updater utility may be configured to run on particular supported information handling systems and to interface with system BIOS code running on these particular systems to complete the BIOS upgrade and facilitate and/or complete OS activation. In this exemplary embodiment, the update utility may be configured to pass a unique private security key to request a modification to the SLIC table locking and enablement.

In one exemplary embodiment, an updater utility as described above may be a separate executable program that performs the following steps: 1) detects that the system is a valid target for the update; 2) calls the external BIOS flash program to update the BIOS to a BIOS containing the SMI calls that manage the SLIC; 3) reboots the system so that the newly installed BIOS becomes active; and 4) makes appropriate SMI calls to manipulate the SLIC enable and lock states.

In this exemplary embodiment, the above-described reserved SMBIOS SMI API function may be configured to install an updated OEM activation string for a new or replacement OS in the BIOS non-volatile memory of an information handling system. The reserved SMI API function may be configured to perform this task by unlocking and enabling the SLIC table in the ACPI table area of the system BIOS non-volatile memory. When a properly formatted call with the private security key is passed to the SMI interface by the BIOS updater utility, the new OEM activation string will be enabled; otherwise the updater utility will terminate with a failure message. In this embodiment, the reserved SMI API function is a unique one-off support function and its interface is only available with the initial field upgrade BIOS via the BIOS Updater Utility. Once it is successfully called to enable the ACPI SLIC table, it becomes a dormant code and is no longer useful. In this way, a BIOS updater utility is provided that limits the systems on which the field activation of a replacement (e.g., updated) OS may occur.

In one embodiment of the disclosed systems and methods, using the private security key as part of the BIOS update utility makes it more difficult for unauthorized parties (e.g., hackers) to pirate an OS activation by examination of the information handling system alone, e.g., by creating a code that tries multiple combinations of the system management interrupt (SMI) class and command codes to see what happens. Additionally, the disclosed systems and methods may be implemented with a BIOS updater utility that only unlocks and enables the SLIC table in system BIOS non-volatile memory (e.g., via appropriate reserved SMI API function) for purpose of activating the OEM activation certificate information provided by an updated or replacement BIOS code to the SLIC table before locking the SLIC table again, and without entering into a manufacturing mode or other state that allows other changes to the system default settings such as another SMI API function to load the system defaults. Thus, the disclosed systems and methods may be implemented using a secret interface (i.e., having a unique and confidential class/command code) in the form of an SMI calling interface that unlocks, enables, disables, and re-locks the SLIC table of system BIOS non-volatile memory without changing any other settings, such as boot sequence. This cannot be accomplished with existing conventional OEM activation schemes provided in standard system BIOS code. Moreover, the disclosed systems and methods may be advantageously employed for an OEM BIOS code (e.g., rebranded BIOS code for resellers) which a reseller installs itself or which is installed through a third party. Thus, resellers that originally had not planned to support OEM OS activation may be given the opportunity to later decide to employ OEM OS activation to seamlessly update the reseller's field systems that have disabled SLIC table, and/or to change the OEM activation information associated therewith.

In a further optional embodiment, only an initial upgrade BIOS code version may include the reserved SMI API function, i.e., no subsequent BIOS releases will include the reserved SMI API function. Together, this initial field upgrade BIOS code and its updater utility may be so employed to provide support for an upgrade to a new or replacement OS (e.g., such as Microsoft Windows 7 or Microsoft Windows 7 embedded) from a previous OS (e.g., such as Microsoft Windows XP or Microsoft Windows XP embedded) for field systems via a secure BIOS upgrade process.

In one respect, disclosed herein is a method of preparing a replacement operating system (OS) on an information handling system for activation on the information handling system using certificate of authority information, including providing an information handling system that itself includes: non-volatile memory including memory space that is locked from editing with a private security key, the locked memory space being configured to unlock to allow editing only upon presentation of the private security key, at least one processing device, the processing device being coupled to access the non-volatile memory, and a first BIOS code and first operating system (OS) code that are each activated and executing on the at least one processing device, neither of the first BIOS code or first OS being capable of supplying the private security key to unlock the locked memory space of the non-volatile memory. The method also may include: providing a replacement BIOS code to replace the first BIOS code, the replacement BIOS code being different than the first BIOS code and being configured with the private security key and the correct certificate of authority information corresponding to the replacement OS; providing BIOS updater code, the BIOS updater code being either separate from the replacement BIOS code or part of the replacement BIOS code; installing the BIOS updater code and installing the replacement BIOS code on the information handling system to replace the first BIOS code; executing the BIOS updater code on the processing device to provide the private security key from the BIOS updater code to cause unlocking of the locked memory space in the non-volatile memory and activating of the correct certificate of authority information in the unlocked memory space in the non-volatile memory; and executing the BIOS updater code on the processing device to cause locking of the unlocked memory space in the non-volatile memory after activation of the correct certificate of authority information in the unlocked memory space in the non-volatile memory.

In another respect, disclosed herein is an information handling system comprising: non-volatile memory including memory space that is locked from editing with a private security key, the locked memory space being configured to unlock to allow editing only upon presentation of the private security key; at least one processing device, the processing device being coupled to access the non-volatile memory; a replacement BIOS code configured to replace a first BIOS code that has previously been activated and executed on the at least one processing device, the first BIOS code being incapable of supplying the private security key to unlock the locked memory space of the non-volatile memory, and the replacement BIOS code being different than the first BIOS code and being configured with the private security key and the correct certificate of authority information corresponding to a replacement OS configured to replace a first OS code that has been previously activated for execution on the at least one processing device; and a BIOS updater code, the BIOS updater code being either separate from the replacement BIOS code or part of the replacement BIOS code. The BIOS updater code may be configured for executing on the processing device to cause performance of the following steps: providing the private security key to unlock the locked memory space in the non-volatile memory, activating the correct certificate of authority information in the unlocked memory space in the non-volatile memory, and locking the unlocked memory space in the non-volatile memory after activation of the correct certificate of authority information in the unlocked memory space in the non-volatile memory.

DESCRIPTION OF ILLUSTRATIVE EMBODIMENTS

Figure 1:
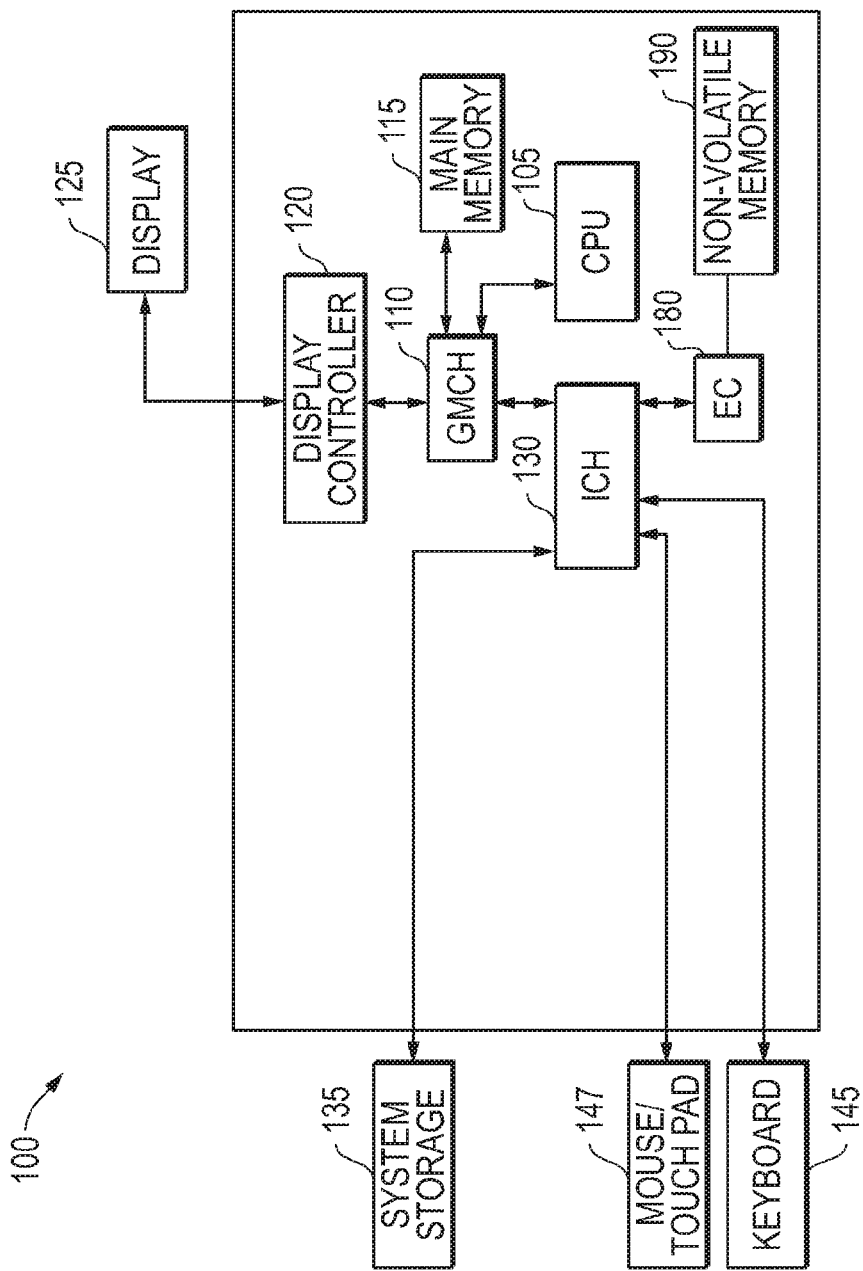
FIG. 1 is a simplified block diagram of an information handling system as it may be configured according to one exemplary embodiment of the disclosed systems and methods.

FIG. 1 is a block diagram of an information handling system 100 as it may be configured according to one exemplary embodiment of the disclosed systems and methods. Information handling system 100 may be, for example, a desktop computer, server, or a portable information handling system such as a notebook computer. As shown in FIG. 1, information handling system 100 of this exemplary embodiment includes a CPU 105 such as an Intel Pentium series processor, an Advanced Micro Devices (AMD) processor or one of many other processing devices currently available. A graphics/memory controller hub (GMCH) chip 110 is coupled to processor 105 to facilitate memory and display functions. System memory 115 and a display controller 120 may be coupled to GMCH 110. A display 125 (e.g., LCD display or other suitable display device) is coupled to display controller 120 to provide visual images to the user. An I/O controller hub (ICH) chip 130 is coupled to GMCH chip 110 to facilitate input/output functions for the information handling system. Local system storage 135 (e.g., one or media drives such as hard disk drive/s, optical drives, etc.) may be coupled to ICH chip 130 to provide permanent system storage for the information handling system. Input devices such as a keyboard 145 and touchpad 147 may be coupled to ICH chip 130 to enable the user to interact with the information handling system. An embedded controller (EC) 180 running system BIOS and system BIOS non-volatile memory 190 are each also coupled to ICH chip 130. It will be understood that the particular configuration of FIG. 1 is exemplary only, and that an information handling system may be configured with fewer, additional or alternative components than those illustrated in FIG. 1, e.g., including a network interface card (wired and/or wireless).

Figure 2:
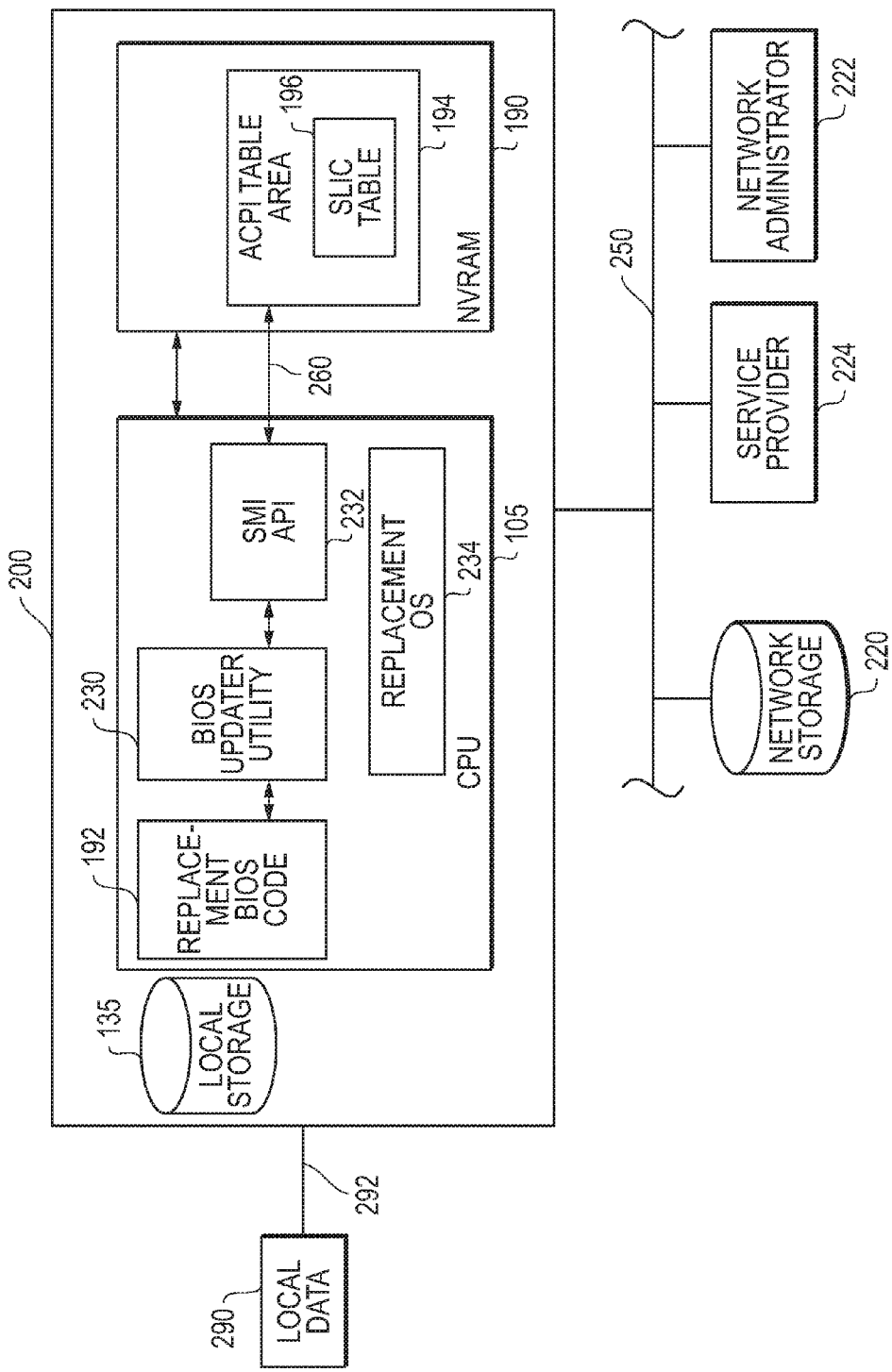
FIG. 2 illustrates an OS and BIOS update architecture according to one exemplary embodiment of the disclosed systems and methods.

FIG. 2 illustrates an OS activation architecture 200 as it may be implemented by an information handling system (e.g., such as information handling system 100 of FIG. 1) according to one exemplary embodiment of the disclosed systems and methods. As shown, OS architecture 200 may be coupled by a data bus 292 (e.g., USB bus, SCSI bus, etc.) to receive BIOS and OS update data from a local source 290 such as USB drive, CD-ROM drive, etc. OS architecture 200 may also be coupled to a network 250, e.g., to receive BIOS and OS update data from a network source such as network storage 220 or from across the Internet via a service provider 224. OS and BIOS update operations may also be optionally controlled across network 250 by a network administrator node 222 as shown.

As shown in FIG. 2, OS activation architecture 200 may be implemented by CPU 105 that is configured to activate and execute a replacement OS 234 upon completion of appropriate steps by BIOS updater utility 230 and reserved SMI API 232 of replacement BIOS 192. In particular, BIOS updater utility 230 is configured as shown to communicate with SLIC table 196 contained in ACPI table area 194 of non-volatile memory 190 (e.g. NVRAM as shown) via reserved SMI API 232 of replacement BIOS code 192 across SMI interface 260. Each of replacement OS 234 and replacement BIOS code 192 may be received and loaded (together or separately) by an information handling system, for example, from across network 250, data bus 292, or from any other suitable data source/s. Replacement OS 234 may be stored on local storage 135 and loaded for activation and execution by CPU 105 to replace a previous and different OS version. Replacement BIOS may be flashed on to non-volatile memory 190 and loaded for activation and execution by CPU 105 to replace a previous and different BIOS code version. In this embodiment, ACPI table area 194 is maintained separately and is not written over by replacement BIOS code version 192. In one exemplary embodiment, reserved SMI API 232 may only be provided with an initial field upgrade BIOS version, i.e., only once and only upon the first BIOS upgrade from the original BIOS version.

Still referring to FIG. 2, reserved SMI API 232 is configured to only provide service to an updater utility 230 that may be provided (as separate code from replacement BIOS code 192 or as part of the same code as replacement BIOS code 192) for installing and activating replacement BIOS code 192 by passing a unique private security key (e.g., such as a unique ID for the platform and/or a specific customer/reseller) to access ACPI area 194 across SMI interface 260 to complete the BIOS upgrade to replacement BIOS 192. Reserved SMBIOS API 232 is further configured to activate updated OEM activation certificate of authority information (e.g., as an updated OEM activation string that includes OEM activation binary information as well as the required identifiers (IDs) for ACPI table) for replacement OS 234 in the locked SLIC table 196 of BIOS non-volatile memory 190. To perform this task, updater utility 230 may be configured to first pass a properly formatted call (e.g., writing a proper command code to the IO address assigned for SMI call) after first checking and confirming the system ID (i.e., which is accessible from the memory (SMBIOS table)) as a private key prior to continuing. Alternatively, updater utility 230 may be configured to pass the properly formatted call with the correct private security key to the SMI interface 260 via reserved SMI API 232.

When the system ID is checked and confirmed, and/or the correct private security key is passed in the above-described manner, reserved SMI API 232 is configured to first unlock and enable SLIC table 196, and then activate the updated OEM activation string into SLIC table 196 to enable the OEM activation string in the SLIC table 196. Reserved SMI API 232 is configured to then enable and lock SLIC table 196. If the correct private security key is not passed to the SMI interface 260, BIOS updater utility 230 will terminate, e.g., with a failure messaged displayed to the information handling system user. In one exemplary embodiment, reserved SMI API 232 may be configured to compare a hard-coded private security key that is kept by SMI API 232 to the private security key that is passed by the updater utility 230. Only if the two keys match does SMI API 232 unlock and enable the SLP Once the updated OEM activation certificate of authority information (e.g., OEM activation string) has been activated in SLIC table 196, then the replacement OS 234 (e.g., Microsoft Windows 7) may access and read the SLIC table 196 to verify that the activated OEM activation certificate of authority information in SLIC table 196 matches the correct certificate of authority information maintained in the OS code. The replacement OS 234 may be activated upon verification that SLIC table 196 contains the correct OEM activation certificate of authority information.

In one exemplary embodiment, reserved SMI API 232 may be provided as a unique one-off support function and its interface 260 only made available one time, e.g., with the initial field upgrade BIOS code 192. Reserved SMIAPI 232 may be configured such that once it is successfully called to unlock and enable ACPI SLIC table 196, it becomes dormant code that is no longer useful. Using such a configuration, BIOS updater utility 230 may be configured to limit field activation of replacement (e.g., updated) OS 234 to one system.

Figure 3:
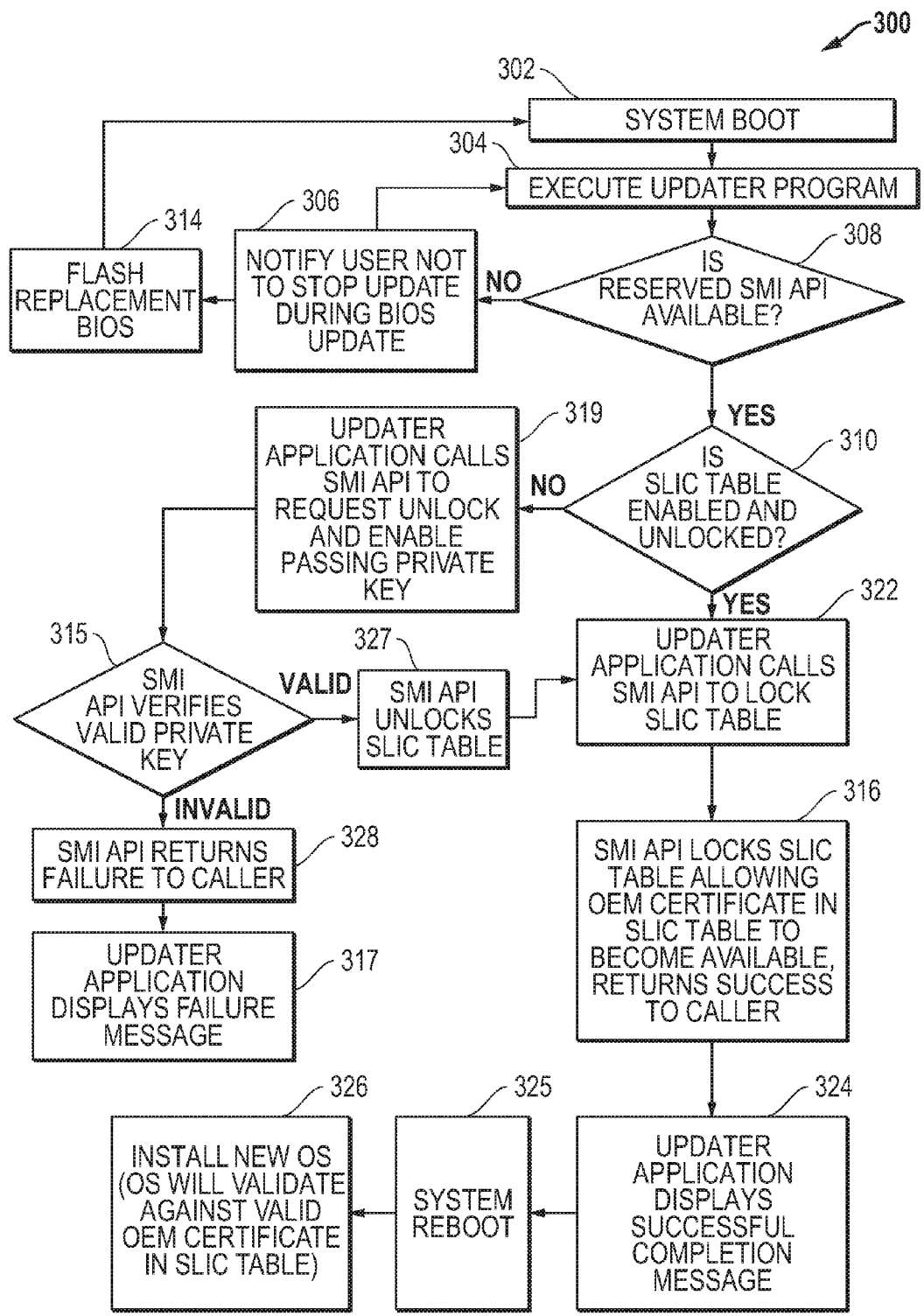
FIG. 3 illustrates methodology as it may be implemented according to one exemplary embodiment of the disclosed systems and methods.

FIG. 3 illustrates one exemplary embodiment of a methodology 300 that may be employed to install and activate a replacement BIOS and replacement OS (e.g., such as Microsoft Windows 7) on an information handling system having a different type or previous version OS such as Windows XP. Although methodology 300 is described herein for illustration purposes in relation to the exemplary OS activation architecture 200 of FIG. 2, it will be understood that methodology 300 may be implemented on any alternative architecture that is suitable for installing and executing a replacement BIOS and replacing OS in coordination with system non-volatile memory.

Methodology 300 may be initiated during system boot in step 302 by BIOS updater utility 230, e.g., that includes a bootable master control program that determines current system configuration and BIOS version. The BIOS updater utility 230 may be executed, for example, by CPU 105 from code stored (e.g., on a USB key or other suitable storage medium) and provided across data bus 292 of FIG. 2. The system is then booted into running BIOS updater utility 230 in step 304. In step 308, the BIOS updater utility 230 checks the non-volatile memory 190 for the availability of SMI API 232 of the replacement BIOS 192. If SMI API 232 is not available, then the BIOS updater utility 230 may optionally notify the user in step 306 not to turn off the system or otherwise interrupt the system until confirmation of the presence and activation of the replacement BIOS is complete and then flashes the replacement BIOS 192 (which includes the reserved SMI API 232 and updated correct OEM certificate of authority information) in step 314 on to non-volatile memory 190. Methodology 300 then returns to step 302 and repeats as shown.

When it is determined in step 308 that SMI API 232 is available, methodology 300 proceeds to step 310 where BIOS updater utility 230 determines if the SLIC table 196 of ACPI table area 194 is unlocked. If SLIC table 196 is not unlocked, methodology 300 proceeds to step 319 and calls the SMI API using the private security key to request unlocking and enabling the SLIC, and then proceeds to step 315. If the updater private security key is found to be correct in step 315, then methodology 300 proceeds to step 327 where the SMI API will unlock and enable the SLIC table with the activated updated OEM certificate of authority information. When the correct private security key is provided, the SLIC table 196 is unlocked, and methodology 300 then returns to step 322 to continue. If the updater private security key is not found correct in step 315, then the SMI code will return an error code to the BIOS updater utility in step 328, and BIOS updater utility 230 may be configured to terminate in step 317 and display error or failure message to the information handling system user.

Still referring to FIG. 3, when SLIC table 196 is found in step 310 to be unlocked, methodology 300 proceeds to step 322 where BIOS updater utility passes a call to reserved SMI API 232 to lock updated SLIC table 196. The SMI code will then lock the SLIC table in step 316 and return success. Locking is not a secure operation, thus no private security key is required for this call. At this time, when the SLIC table 196 is found locked and enabled in step 316, methodology 300 proceeds to step 324 where an optional BIOS update completion message may be displayed to the information handling system user. At this point, SMI API 232 is disabled from further execution, and becomes dormant code, and the BIOS update steps of methodology 300 terminate.

After completion of step 324, replacement OS 234 is now ready for installation in step 326 following system reboot in step 325, after which it is determined if SLIC table 196 contains the correct OEM certificate of authority information for activation of the current copy of replacement OS 234. For example, assuming that the OEM certificate of authority information in SLIC table 196 matches the certificate of authority information for the current copy of replacement OS 234, then replacement OS 234 is activated. However, if for some reason the the OEM certificate of authority information in SLIC table 196 does not match the certificate of authority information for the current copy of replacement OS 234, then replacement OS may display an error or warning message to the user. It will be understood that these are only exemplary OS installation and activation steps, and that any other methodology that is suitable for activation of an OS using the updated OEM certificate of authority information may be employed following termination of methodology 300 in step 324.

It will be understood that the particular number and combination of steps illustrated in FIG. 3 are exemplary only, and that any other combination of fewer, additional, or different steps may be employed that are suitable for installing and using a replacement BIOS to prepare for, or otherwise facilitate activation of a replacement OS on an information handling system in one or more of the manners described herein.

It will also be understood that one or more steps of methodology 300 of FIG. 3 may be implemented by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as a processor, microprocessor, microcontroller, controller, etc.) to perform the one or more steps of methodology 300. A computer program of instructions may be stored in or on the non-transitory computer-readable medium residing on or accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodology may be employed in one or more code segments of the present computer program. For example, a code segment executed by the information handling system may include one or more steps of the disclosed methodology.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of preparing a replacement operating system (OS) on an information handling system for activation on the information handling system using certificate of authority information, comprising:
   providing an information handling system comprising:
      BIOS non-volatile memory including memory space that is locked from editing with a private security key, the locked memory space being configured to unlock to allow editing only upon presentation of the private security key,
      at least one processing device, the processing device being coupled to access the non-volatile memory, and
      a first BIOS code and first operating system (OS) code that are each activated and executing on the at least one processing device, neither of the first BIOS code or first OS being capable of supplying the private security key to unlock the locked memory space of the non-volatile memory;
   providing a replacement BIOS code to replace the first BIOS code, the replacement BIOS code being different than the first BIOS code and being configured with the correct certificate of authority information corresponding to the replacement OS;
   providing BIOS updater code that includes the private security key, the BIOS updater code being either separate from the replacement BIOS code or part of the replacement BIOS code;
   installing the BIOS updater code and installing the replacement BIOS code on the information handling system to replace the first BIOS code, the replacement BIOS code including updated correct certificate of authority information;
   then executing the BIOS updater code on the processing device to provide the private security key from the BIOS updater code to the installed replacement BIOS code;
   then executing the replacement BIOS code on the processing device to:
      determine if the private security key provided by the BIOS updater code is a valid private security key, and
      cause unlocking of the locked memory space in the non-volatile memory and installation of the updated correct certificate of authority information in the unlocked memory space in the non-volatile memory only if the replacement BIOS code determines that the private security key provided by the BIOS updater code is a valid private security key;
   then executing the BIOS updater code on the processing device to call the replacement BIOS code to cause locking of the unlocked memory space in the non-volatile memory after installation of the updated correct certificate of authority information in the unlocked memory space in the non-volatile memory; and then executing the replacement BIOS code on the processing device to cause locking of the unlocked memory space in the non-volatile memory in response to the call received by the replacement BIOS code from the installed BIOS updater code.

2. The method of claim 1, further comprising:
installing a replacement OS code to replace the first OS code, the replacement OS code being different than the first OS code and requiring the presence of the updated correct certificate of authority information contained in the locked space of the non-volatile memory to activate the replacement OS code on the information handling system; and
activating the replacement OS on the information handling system by accessing the installed updated correct certificate of authority information in the locked memory space of the non-volatile memory.

3. The method of claim 1, where the first OS code is not configured to access or employ certificate of authority information in the locked memory space of the non-volatile memory for the previous activation of the first OS code on the information handling system.

4. The method of claim 1, further comprising activating the replacement OS on the information handling system without communicating across a network with a network source to complete the authorization process.

5. The method of claim 1, where the locked memory space in the non-volatile memory comprises a software license information SLIC table.

6. The method of claim 5, where the steps of unlocking, installing and locking are performed without changing any other settings in the BIOS non-volatile memory.

7. The method of claim 1, where the replacement BIOS code includes a system management interface application programming interface (SMI API), and where the method further comprises using the SMI API to perform the following sequence of steps in response to system calls issued by the BIOS updater code only a single time immediately after the step of installing the replacement BIOS code to replace the first BIOS code, and immediately prior to preventing the SMI API from ever performing the sequence of following steps any additional times:
unlocking the locked memory space in the non-volatile memory;
installing the updated correct certificate of authority information in the unlocked memory space in the non-volatile memory; and
locking the unlocked memory space in the non-volatile memory after installation of the updated correct certificate of authority information in the unlocked memory space in the non-volatile memory.

8. The method of claim 1, where the replacement BIOS code includes a system management interface application programming interface (SMI API) and where the method further comprises providing a BIOS updater utility that is separate from the replacement BIOS code and that implements the BIOS updater code, where the SMI API is configured to only provide service to the updater utility for installing the replacement BIOS code, and where the updater utility is configured to implement performance of the following steps by passing corresponding system calls to the SMI API:
cause the SMI API to unlock the locked memory space in the non-volatile memory;
cause the SMI API to install the updated correct certificate of authority information in the unlocked memory space in the non-volatile memory; and
cause the SMI API to lock the unlocked memory space in the non-volatile memory after installation of the updated correct certificate of authority information in the unlocked memory space in the non-volatile memory.

9. The method of claim 1, further comprising performing the following steps after the information handling system has been field-deployed from a manufacturer or supplier of the information handling system to an end user:
providing the replacement BIOS code to replace the first BIOS code;
providing the BIOS updater code;
installing the BIOS updater code and installing the replacement BIOS code to replace the first BIOS code, the replacement BIOS code being different than the first BIOS code and being configured with the correct certificate of authority information corresponding to the replacement OS;
then executing the BIOS updater code on the processing device to provide the private security key from the BIOS updater code to the replacement BIOS code;
then executing the replacement BIOS code on the processing device to cause installation of the updated correct certificate of authority information in the unlocked memory space in the non-volatile memory only if the replacement BIOS code determines that the private security key provided by the BIOS updater code is a valid private security key; and
then executing the BIOS updater code on the processing device to call the replacement BIOS code to cause locking of the unlocked memory space in the non-volatile memory after installation of the updated correct certificate of authority information in the unlocked memory space in the non-volatile memory; and
then executing the replacement BIOS code on the processing device to cause locking of the unlocked memory space in the non-volatile memory in response to the call received by the replacement BIOS code from the installed BIOS updater code.

10. The method of claim 9, where the end user is a corporate customer of the manufacturer or supplier of the information handling system; and wherein the method further comprises performing the method to prepare a replacement operating system (OS) for activation on a plurality of the information handling systems.

11. The method of claim 1, where the information handling system comprises at least one of a desktop computer, laptop computer, or server.

12. The method of claim 1, further comprising performing the step of executing the replacement BIOS code on the processing device to determine if the private security key provided by the BIOS updater code is a valid private security key by comparing the private security key provided by the BIOS updater code to a hard-coded private security key that is kept by the replacement BIOS code.

13. The method of claim 1, further comprising disabling the SMI API from further execution so that the SMI API becomes dormant code after the step of locking the unlocked memory space in the non-volatile memory.

14. The method of claim 1, further comprising executing the BIOS updater code on the processing device to provide the private security key from the BIOS updater code to the installed replacement BIOS code to cause the replacement BIOS code to unlock the locked memory space in the non-volatile memory only for installation of the updated correct certificate of authority information in the unlocked memory space in the non-volatile memory and without entering into a manufacturing mode or other state that allows other changes to system default settings.

15. The system of claim 1, where the BIOS updater code is configured to execute on the processing device to provide the private security key to the replacement BIOS code to cause the replacement BIOS code to unlock of the locked memory space in the non-volatile memory only for installation of the updated correct certificate of authority information in the unlocked memory space in the non-volatile memory and without entering into a manufacturing mode or other state that allows other changes to system default settings.

16. An information handling system comprising:
   BIOS non-volatile memory including memory space that is locked from editing with a private security key, the locked memory space being configured to unlock to allow editing only upon presentation of the private security key;
   at least one processing device, the processing device being coupled to access the non-volatile memory;
   a replacement BIOS code configured to replace a first BIOS code that has previously been activated and executed on the at least one processing device, the first BIOS code being incapable of supplying the private security key to unlock the locked memory space of the non-volatile memory, and the replacement BIOS code being different than the first BIOS code and being configured with updated correct certificate of authority information corresponding to a replacement OS configured to replace a first OS code that has been previously activated for execution on the at least one processing device; and
   a BIOS updater code that includes the private security key, the BIOS updater code being either separate from the replacement BIOS code or part of the replacement BIOS code;
   where the BIOS updater code is configured for executing on the processing device to provide the private security key to the replacement BIOS code; and
   where the replacement BIOS code is configured for executing on the processing device to:
      determine if the private security key provided by the BIOS updater code is a valid private security key,
      unlock the locked memory space in the non-volatile memory and install the updated correct certificate of authority information in the unlocked memory space in the non-volatile memory only if the replacement BIOS code determines that the private security key provided by the BIOS updater code is a valid private security key;
   where the BIOS updater code is configured for then executing on the processing device to call the replacement BIOS code to cause locking of the unlocked memory space in the non-volatile memory after installation of the updated correct certificate of authority information in the unlocked memory space in the non-volatile memory; and
   where the replacement BIOS code is configured for then executing on the processing device to lock the unlocked memory space in the non-volatile memory in response to the call received by the replacement BIOS code from the installed BIOS updater code.

17. The system of claim 16, further comprising a replacement operating system (OS) code configured to replace a first OS code that has been previously activated for execution on the at least one processing device, the first OS code being incapable of supplying the private security key to unlock the locked memory space of the non-volatile memory, and the replacement OS code being different than the first OS code and configured to require the presence of the updated correct certificate of authority information contained in the locked space of the non-volatile memory to activate the replacement OS code on the information handling system.

18. The system of claim 16, where the replacement OS is configured to be activated on the information handling system without communicating across a network with a network source to complete the authorization process.

19. The system of claim 16, where the locked memory space in the non-volatile memory comprises a software license information SLIC table.

20. The system of claim 16, where the replacement BIOS code includes a system management interface application programming interface (SMI API) configured to execute on the processing device to access the non-volatile memory and perform the following steps in response to system calls issued by the BIOS updater code only a single time immediately after installation of the replacement BIOS code to replace the first BIOS code, and immediately prior to being disabled from ever performing the sequence of following steps any additional times:
   unlocking the locked memory space in the non-volatile memory;
   installing the updated correct certificate of authority information in the unlocked memory space in the non-volatile memory; and
   locking the unlocked memory space in the non-volatile memory after installation of the updated correct certificate of authority information in the unlocked memory space in the non-volatile memory.

21. The system of claim 20, where the replacement BIOS code is configured to execute on the processing device to disable the SMI API from further execution so that the SMI API becomes dormant code after the SMI API locks the unlocked memory space in the non-volatile memory.

22. The system of claim 20 where the SMI API is configured to execute on the processing device to execute the steps of unlocking, installing and locking without changing any other settings in the BIOS non-volatile memory.

23. The system of claim 16, where the replacement BIOS code includes a system management interface application programming interface (SMI API); where the system further comprises a BIOS updater utility that is separate from the replacement BIOS code and that implements the BIOS updater code; where the SMI API is configured to execute on the processing device to only provide service to the updater utility for installing the replacement BIOS code, and where the updater utility is configured to implement performance of the following steps by passing corresponding system calls to the SMI API to cause the SMI API to:
   unlocking the locked memory space in the non-volatile memory;
   installing the updated correct certificate of authority information in the unlocked memory space in the non-volatile memory; and
   locking the unlocked memory space in the non-volatile memory after installation of the updated correct certificate of authority information in the unlocked memory space in the non-volatile memory.

24. The system of claim 16, where the replacement BIOS code and BIOS updater code are configured to install and execute on the processing device to cause performance of the following steps after the information handling system has been field-deployed from a manufacturer or supplier to an end user in the following manner:

the BIOS updater code being configured to execute on the processing device to provide the private security key to the replacement BIOS code;

the replacement BIOS code being configured to then execute on the processing device to install the updated correct certificate of authority information in the unlocked memory space in the non-volatile memory only if the replacement BIOS code determines that the private security key provided by the BIOS updater code is a valid private security key; and the BIOS updater code being configured to then execute on the processing device to call the replacement BIOS code to lock the unlocked memory space in the non-volatile memory after activation of the correct certificate of authority information in the unlocked memory space in the non-volatile memory; and the replacement BIOS code being configured to then execute on the processing device to lock the unlocked memory space in the non-volatile memory in response to the call received by the replacement BIOS code from the installed BIOS updater code.

25. The system of claim 24, where the end user is a corporate customer of the manufacturer or supplier of the information handling system.

26. The system of claim 16, where the information handling system comprises at least one of a desktop computer, laptop computer, or server.

27. The system of claim 16, where the replacement BIOS code is configured to execute on the processing device to determine if the private security key provided by the BIOS updater code is a valid private security key by comparing the private security key provided by the BIOS updater code to a hard-coded private security key that is kept by the replacement BIOS code.

* * * * *